(12) United States Patent
Westen

(10) Patent No.: US 9,116,221 B2
(45) Date of Patent: Aug. 25, 2015

(54) VARIABLE PRECISION LOCATION SHARING

(75) Inventor: Peter Westen, Mountain View, CA (US)

(73) Assignee: Apple Inc., Cupertino, CA (US)

(*) Notice: Subject to any disclaimer, the term of this patent is extended or adjusted under 35 U.S.C. 154(b) by 397 days.

(21) Appl. No.: 12/869,674

(22) Filed: Aug. 26, 2010

(65) Prior Publication Data

US 2012/0050033 A1 Mar. 1, 2012

(51) Int. Cl.
G08B 1/08 (2006.01)
G01S 5/00 (2006.01)
H04L 29/06 (2006.01)
H04W 4/02 (2009.01)
H04W 4/20 (2009.01)
H04L 29/08 (2006.01)

(52) U.S. Cl.
CPC ........... *G01S 5/0027* (2013.01); *H04L 63/0442* (2013.01); *H04L 67/26* (2013.01); *H04W 4/02* (2013.01); *H04W 4/20* (2013.01); *H04L 63/105* (2013.01)

(58) Field of Classification Search
CPC ... G01S 5/0027; H04L 63/0442; H04L 67/26; H04L 63/105
USPC .................................................. 340/539.13
See application file for complete search history.

(56) References Cited

U.S. PATENT DOCUMENTS

| | | | | |
|---|---|---|---|---|
| 7,873,710 | B2 * | 1/2011 | Kiley et al. | 709/220 |
| 8,000,726 | B2 * | 8/2011 | Altman et al. | 455/456.3 |
| 2003/0008672 | A1 | 1/2003 | Fujii | |
| 2004/0044911 | A1 | 3/2004 | Takada | |
| 2006/0174329 | A1 * | 8/2006 | Dublish | 726/4 |
| 2007/0086593 | A1 * | 4/2007 | Denning et al. | 380/286 |
| 2007/0088818 | A1 * | 4/2007 | Roberts et al. | 709/224 |

(Continued)

FOREIGN PATENT DOCUMENTS

| | | |
|---|---|---|
| EP | 1139687 | 10/2001 |
| EP | 1850606 | 10/2007 |

(Continued)

OTHER PUBLICATIONS

International Search Report from related PCT Application No. PCT/US2011/047466, dated Sep. 15, 2011.

(Continued)

*Primary Examiner* — Naomi Small
(74) *Attorney, Agent, or Firm* — Fish & Richardson P.C.

(57) ABSTRACT

A secure location sharing system is disclosed that allows publishers to share their locations with subscribers. Each publishing device generates, encrypts and publishes its location information with a specified precision to a distribution service for distribution to one or more subscribing devices. The distribution service provides secure distribution of the location information to the distribution list but cannot access the publisher's precise location information, which remains encrypted until decrypted at the subscribing devices. Publishers can share their location information with varying levels of precision for different subscribers. Publishers can select at least two dimensions of location information precision: spatial and temporal. For less precise location sharing, the publishing device can randomize or otherwise obscure the precise location of the publishing device. The publisher can move a subscriber or a group of subscribers to a lower or higher level of location precision by generating new key pairs at the publishing device.

16 Claims, 6 Drawing Sheets

(56) References Cited

U.S. PATENT DOCUMENTS

| | | | | |
|---|---|---|---|---|
| 2008/0252527 | A1* | 10/2008 | Garcia | 342/450 |
| 2009/0047972 | A1* | 2/2009 | Neeraj | 455/456.1 |
| 2009/0132813 | A1* | 5/2009 | Schibuk | 713/158 |
| 2009/0254971 | A1* | 10/2009 | Herz et al. | 726/1 |
| 2010/0203903 | A1* | 8/2010 | Dingler et al. | 455/456.5 |
| 2010/0211425 | A1* | 8/2010 | Govindarajan | 705/8 |
| 2011/0208958 | A1* | 8/2011 | Stuedi et al. | 713/150 |
| 2011/0277036 | A1* | 11/2011 | Nilsson | 726/26 |
| 2011/0307403 | A1* | 12/2011 | Rostampour et al. | 705/325 |

FOREIGN PATENT DOCUMENTS

| | | |
|---|---|---|
| GB | 2375011 | 10/2002 |
| JP | 2004343346 A | 12/2004 |
| JP | 2004032376 A5 | 10/2005 |
| JP | 2009296452 A | 12/2009 |

OTHER PUBLICATIONS

International Preliminary Report on Patentability, International Application No. PCT/US2011/047466, 8 pages, dated Feb. 26, 2013.

* cited by examiner

VARIABLE PRECISION LOCATION SHARING

TECHNICAL FIELD

This disclosure relates generally to location sharing between multiple devices.

BACKGROUND

The sharing of ones location is a popular application for modern mobile devices. Existing location sharing systems do not provide user's with control over the precision of their location information. Also, networks that support location sharing, while secure against outside attackers, are privy to the location information being shared. Users must trust that a company operating a server handling their location information will not make unwelcome use of their location information. Finally, existing location sharing systems offer no means for granting higher privileges to recipients of location information on a temporary basis.

SUMMARY

A secure location sharing system is disclosed that allows publishers to share their locations with subscribers. Each publishing device generates, encrypts and publishes its location information with a specified precision to a distribution service for distribution to one or more subscribing devices. The distribution service provides secure distribution of the location information to the distribution list but cannot access the publisher's precise location information, which remains encrypted until decrypted at the subscribing devices. Publishers can share their location information with varying levels of precision for different subscribers or groups of subscribers. Publishers can select at least two dimensions of location information precision: spatial and temporal. For less precise location sharing, the publishing device can randomize or otherwise obscure the precise location of the publishing device. The publisher can move a subscriber or a group of subscribers to a lower or higher level of location precision by generating new key pairs on the publishing device.

In some implementations, a computer-implemented method is performed by one or more hardware processors of a publishing device. The method can begin by obtaining location information describing the location of the publishing device. A specification of a precision of the location information is obtained. The precision can be spatial and/or temporal. The location information is modified based on the specified precision. The modified location information can be encrypted using a public location key. The encrypted location information can be published to a distribution service for distribution to the one or more subscribing devices. A private location key can be used to decrypt the modified location information on a subscribing device. The private location key can be included in a message that is encrypted by the publishing device with a public message key of the subscriber. The message can be transmitted to the distribution service for distribution to the subscriber. The private location key can be decrypted by the subscriber from the encrypted message using the subscriber's private message key.

In some implementations, a computer-implemented method is performed by one or more processors of a subscribing device. The method can begin when a subscribing device receives encrypted location information from a publishing device, where the location information is modified from a precise location according to a specified precision. A private location key can be received by the subscribing device in a message that was encrypted by the publishing device with a public message key associated with the subscriber. The private location key can be decrypted from the message using the subscriber's corresponding private message key. The subscribing device can user the private location key to decrypt the location information. The decrypted location information can be displayed on the subscribing device or used by an application running on the subscribing device.

One or more implementations of variable precision location sharing can provide one or more of the following advantages: 1) publishers can control the precision of their shared location, 2) networks that support location sharing cannot access the encrypted location information, which can only be decrypted by subscribing devices with appropriate access privileges (e.g., private keys), and 3) publishers can temporarily grant subscribers with access privileges to more or less precise versions of their location information.

The details of one or more implementations of variable precision location sharing are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Example Variable Precision Location Sharing System

Figure 1A:
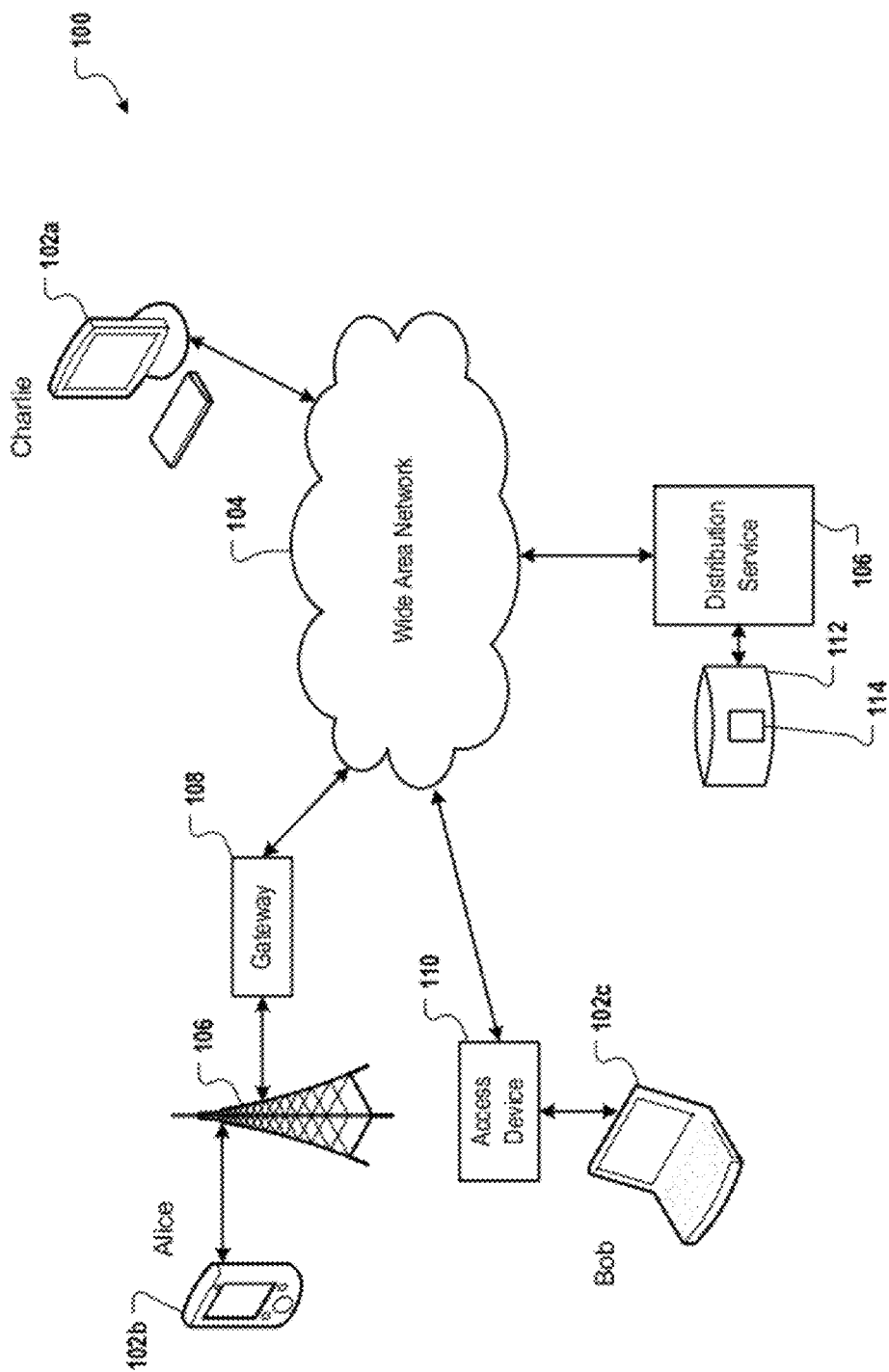
FIG. 1A is a block diagram of a variable precision location sharing system.

FIG. 1A is a block diagram of a variable precision location sharing system 100. In some implementations, system 100 includes location aware devices 102a-102c and distribution service 106, communicating with each other through network 104 (e.g., Internet). Devices 102a-102c can be a mobile device, such as a smart phone, e-mail device, game device, laptop computer, electronic tablet, media player or any other location aware device with communication capability. Each device 102a-102c can include a display surface for presenting a user interface for facilitating user input. The display can be a touch sensitive surface capable of responding to multi-touch input with one or more fingers or a stylus.

In some implementations, devices 102a-102c can determine or receive current location information. For example, one or more of devices 102a-102c can include or be coupled to a Global Positioning System (GPS) receiver for determining location information. In other examples, the location information can be provided to the device by a service that uses wireless communication network transmitters (e.g., WiFi, Cell-ID) and triangulation techniques to determine a location of a device. In this example, location information is provided to device 102b as position coordinates (e.g., latitude, longitude, altitude) through a gateway 108 and cell tower 106. Location information is provided to device 102c through a wireless network access device 110 (e.g., a wireless router). Location information for device 102a is fixed. In the example shown, device 102a is operated by Charlie, device 102b is operated by Alice and device 102c is operated by Bob.

Distribution service 106 can include one or more server computers for communicating with publishing devices and subscribing devices. For example, distribution service can be one or more server computers operated by a telecommunications carrier or Internet Service Provider (ISP). In some implementations, distribution service 106 can be a trusted third party (TTP) in a Public key Infrastructure (PKI). Distribution service 106 can be part of a private or public network. Distribution service 106 can include a repository 112 for storing various information 114, such as encrypted locations, distribution lists for subscribers, public keys, certificates, blacklists, etc.

In the example shown, Alice would like to share her imprecise location information with Bob and her precise location information with Charlie. Sharing a "precise location" means sharing the location of the publishing device as provided by the positioning technology available to the publishing device. Accordingly, "precise location" does not necessarily mean the exact location. Indeed, the "precise location" may be different than the exact location due to position errors inherent in, or produced by, the positioning technology employed by the publishing device. Sharing an "imprecise location" means sharing a defined geographic region where the publishing device is located. In some implementations, variable precision location sharing can be implemented using public-key cryptography, as described in reference to FIG. 1C.

Alice, Bob and Charlie can each invoke a location sharing application on their respective devices. Using one or more user interfaces of the location sharing application, Alice can specify that Bob will receive her imprecise location information and that Charlie will receive her precise location information. For example, Alice has close relationship with Charlie, and therefore would like to share her precise location with Charlie. On the other hand, Alice's relationship with Bob is less close, such that Alice would prefer that Bob not know her precise location.

Using a location sharing application on device 102b, Alice sends her precise and imprecise locations to distribution service 106. For Charlie, Alice's precise location information (e.g., GPS position coordinates) is encrypted on device 102b without modification. For Bob, Alice's precise location information is modified to be imprecise and encrypted. Both encrypted locations are transmitted to distribution service 106. A distribution list including Bob and Charlie can also be transmitted to distribution service 106. The distribution list can be a predefined list of subscribers stored by distribution service 106. The distribution list can be used by distribution service 106 to distribute Alice's imprecise and precise locations to Bob and Charlie, respectively, in a single update or as separate updates based on a specified temporal precision (e.g., update every 2 hours or every 30 minutes), as described in reference to FIG. 1B.

Alice's precise and imprecise location information can be encrypted and distributed using public-key cryptography. The location information remains encrypted while in the possession of distribution service 106 and cannot be accessed by distribution service 106 since only Bob and Charlie possess the necessary decrypting information (e.g., private location keys).

In some implementations, Alice's imprecise location can be created by randomizing her precise location based on a specified spatial precision parameter. The randomization can be applied to her precise position coordinates, such that the modified position coordinates fall within a bounded geographic region. For example, if the spatial precision is specified by Alice to be within 5 miles of Alice's precise location, then an imprecise location can be generated randomly that is within 5 miles of Alice's precise location. Alice's imprecise location and an indication of the spatial precision (e.g., 5 miles) can be published to the distributed service 106 and distributed to Bob, so that a bounded geographic area (e.g., a circle of radius of 5 miles) can be presented on a map displayed on Bob's device. A circle or other geographic boundary displayed on the map can indicate that Alice is located somewhere within the geographic area encompassed by the boundary. In some implementations, a geographical grid cell of varying shape and size, and representing a varying degree of geographic granularity (e.g., country, state, region, city), can be used as a geographic boundary rather than a circle.

In some implementations, suitable heuristics can be used to determine if a particular geographic boundary encompasses a geographic region that cannot contain the actual location of Alice, such as a bounding circle that encompasses both a coastline and a body of water along the coastline. In some implementations, an update to the imprecise location displayed on Bob's device is provided only when Alice exits the geographic area encompassed by the circle. Otherwise, Bob could track sequential updates and look at the overlap of each circle to deduce a more precise location for Alice.

Example User Interface for Selecting Precision

Figure 1B:
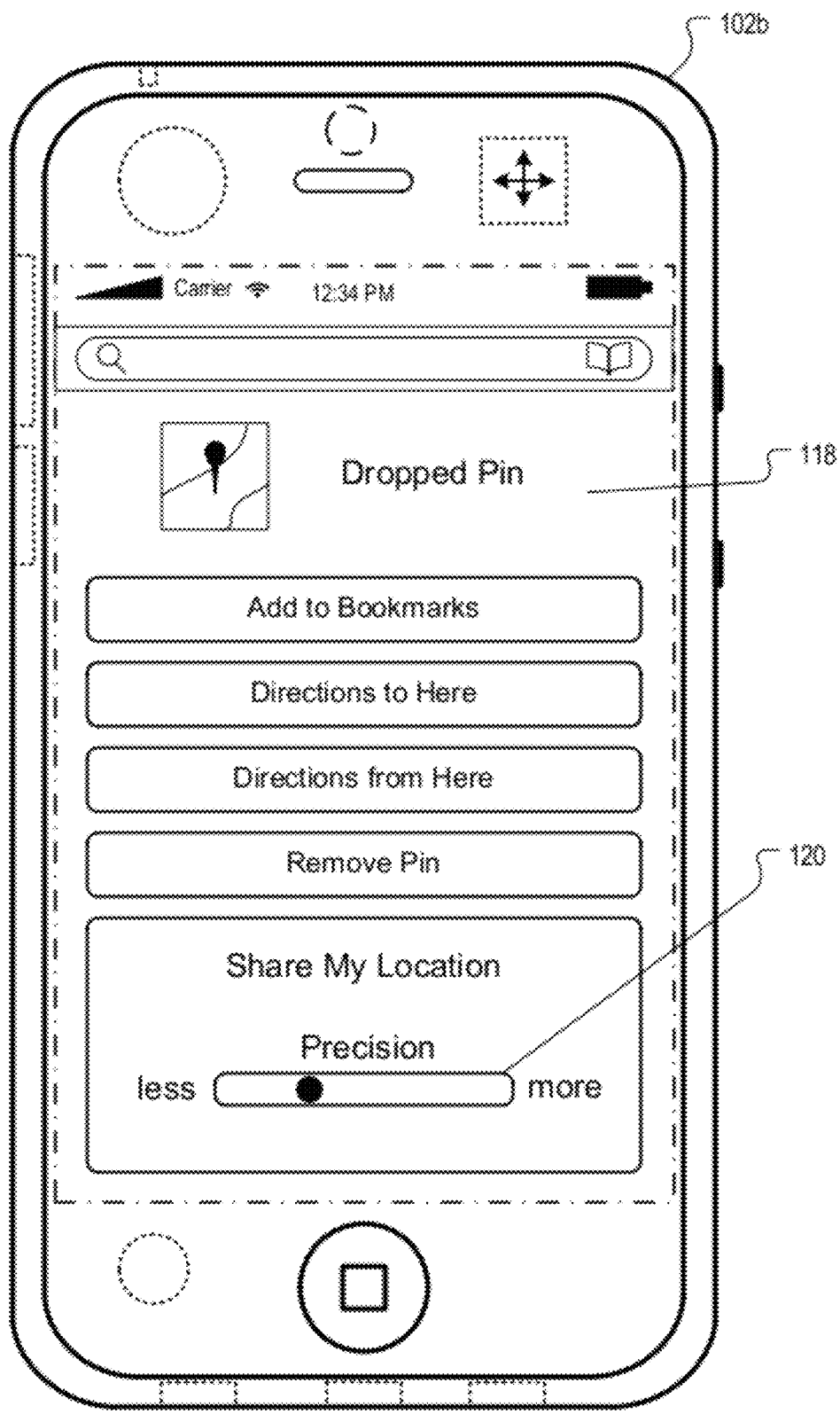
FIG. 1B illustrates an exemplary user interface of a location sharing application.

FIG. 1B illustrates an exemplary user interface 118 of a location sharing application. In this example, a location sharing application is running on mobile device 102b operated by Alice. Alice can adjust the temporal and/or spatial precision of her shared location using slider control 120. Temporal precision can be based on the frequency of location updates. Spatial precision can be based on the amount of position error (e.g., measured as a distance from the publishing device). For example, Alice may want Bob to know her location within +/−10 miles; updated every 2 hours. By contrast, Alice may want Charlie to know her location within +/−1 miles; updated every 30 minutes. Sliding control 120 to the right of user interface 118 makes Alice's shared location more precise and sliding control 120 to the left of user interface 118 makes Alice's shared location more imprecise. In some implementations, preset precision values can be selected by the publisher or by an application. Other controls are possible, including separate controls for adjusting temporal and spatial precision.

Example Encryption System for Secure Location Sharing

Figure 1C:
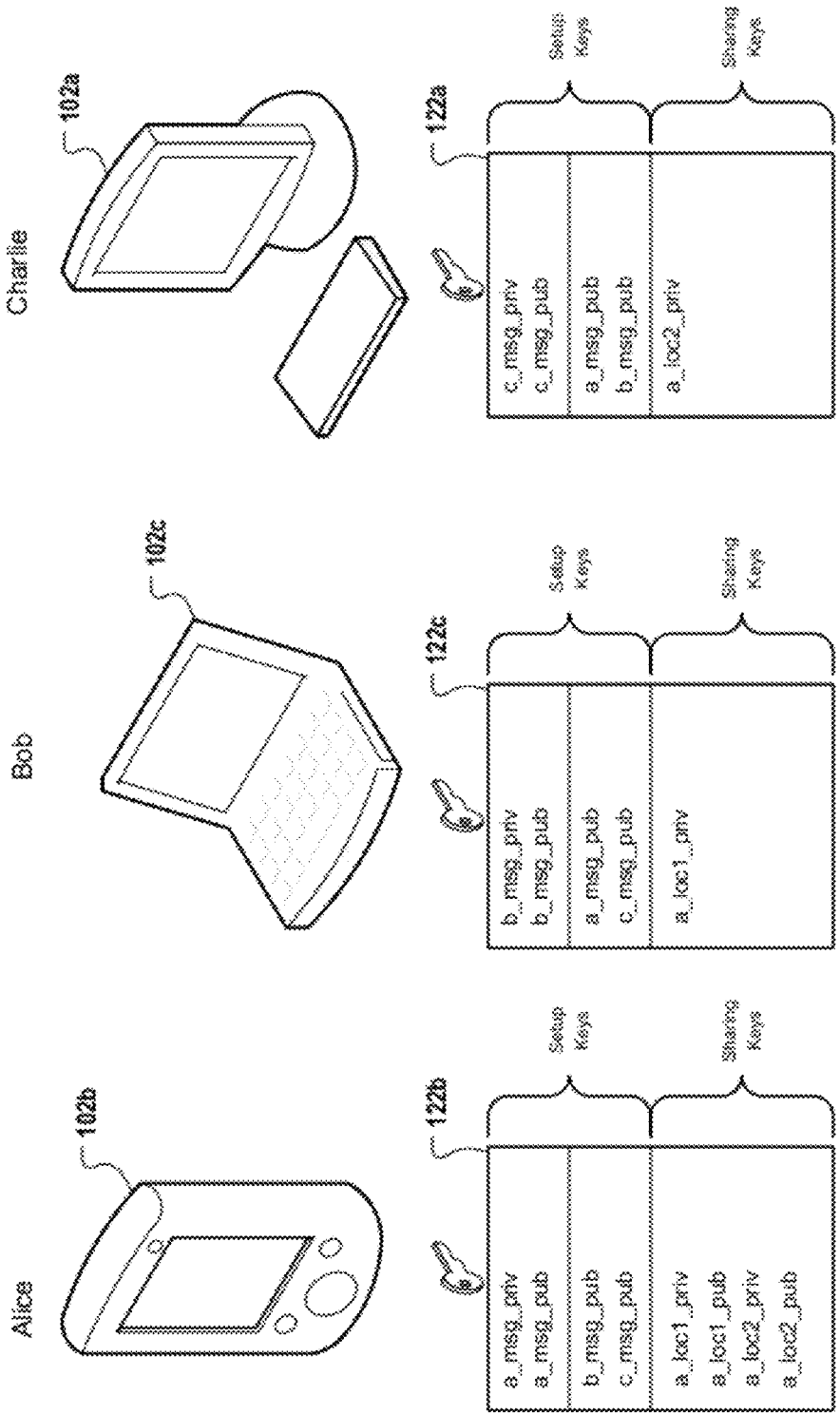
FIG. 1C illustrates a public-key cryptography system for variable precision location sharing.

FIG. 1C illustrates a public-key cryptography system for variable precision location sharing. The public-key cryptography system publishes variable precision location information using mathematically related asymmetric key pairs, including a secret private key and a published public key. Location information can be encrypted using a public location key, which can only be decrypted using a corresponding private location key. Asymmetric key pairs can also be used to protect the authenticity of a message containing encrypted location information by creating a digital signature of the message using a private message key, which can be verified using a corresponding public key. Some examples of suitable asymmetric key techniques for variable precision location sharing are described in the publicly available RSA public-key cryptography standards (e.g., version 2.1), including but not limited to Diffie-Hellman key exchange protocol. Other asymmetric key techniques can also be used, such as Digital Signature Standard (DSS) and various elliptic curve techniques.

In the example shown, there are two types of key pairs: message key pairs and location key pairs. Each user of the system 100 (e.g., Alice, Bob, Charlie) has a signed certificate with a public and private message key used to receive secure messages between individual users. The public message keys can be distributed by distributed service 106 or another TTP, so that any publisher can encrypt a message with the public message key of a subscriber that is only readable by the subscriber using the corresponding private message key, which is securely stored on the subscribing device. Each device 102a-102c can include a respective secure keystore 122a-122c for securely storing setup keys and sharing keys, as shown in FIG. 1C.

Setup keys can include a personal message key pair. For example, Alice's keystore 122b can include Alice's personal message key pair (a_msg_priv and a_msg_pub), Bob's keystore 122c can include Bob's personal message key pair (b_msg_priv and b_msg_pub), and Charlie's keystore 122a can include Charlie's personal message key pair (c_msg_priv and c_msg_pub). Setup keys can also include the public message keys of other users. For example, Alice's keystore 122b can include Bob's public message key (b_msg_pub) and Charlie's public message key (c_msg_pub), Bob's keystore 122c can include Alice's public message key (a_msg_pub) and Charlie's public message key (a_msg_pub), and Charlie's keystore 122a can include Alice's public message key (a_msg_pub) and Bob's public message key (b_msg_pub).

The sharing keys can be used to secure the sharing of variable precision location information. For example, suppose Alice wants to share her imprecise location with Bob, at a precision of 10 miles every 2 hours. Alice's device 102b can generate a new location key pair (a_loc1_pub, a_loc1_priv), which can be used to encrypt the imprecise location information having the specified spatial and temporal precision of 10 miles every 2 hours. Additionally, Alice wants to share her precise location with Charlie. Alice's device 102b can generate a new location key pair (a_loc2_pub, a_loc2_priv), which can be used to encrypt Alice's precise location information. Alice sends the private location key (a_loc1_priv), which has been encrypted by Bob's public message key (b_msg_pub), to distribution service 106 for distribution to Bob. Alice also sends the private key (a_loc2_priv), encrypted by Charlie's public message key (c_msg_pub), to distribution service 106 for distribution to Charlie. Distribution service 106 delivers the encrypted messages to Bob and Charlie. Bob decrypts the encrypted message with his private message key (b_msg_priv) to get the private location key (a_loc1_priv). Likewise, Charlie decrypts the encrypted message with his private message key (c_msg_priv) to get the private location key (a_loc2_priv).

On a first specified schedule or in response to a trigger event, Alice sends her imprecise location to distribution service 106 using the public location key for her imprecise location (a_loc1_pub). Distribution service 106 forwards the message to Bob's device 102c. A decryption process running on device 102c, decrypts the imprecise location using the corresponding private location key (a_loc1_priv), which is only made available to Bob's device 102c.

On a second specified schedule or in response to a trigger event, Alice sends her precise location to distribution service 106 using the public location key for her precise location (a_loc2_pub). Distribution service 106 forwards the message to Charlie's device 102a. A decryption process running on device 102a, decrypts the precise location using the corresponding private location key (a_loc2_priv), which is only made available to Charlie's device 102a. In some implementations, the first and second specified schedules can be the same and both encrypted locations can be delivered to Bob and Charlie, with only Charlie possessing the private location key a_loc2_priv for decrypting Alice's precise location information. Since Bob only possesses the private location key (a_loc1_priv), Bob can only decrypt Alice's imprecise location information. Since the location information remains encrypted until decrypted at the subscribing device, the distribution service cannot access Alice's precise location, thus protecting her privacy.

To increase granularity of location sharing for an existing group of subscribers, a publisher's device can push more precise location information more often using the same location keys. To move a subscriber from a first group of subscribers receiving location information having a first level of precision to a second group of subscribers receiving location information having a second, higher level of precision, the publishing device can send the appropriate private location key to that subscriber with the subscriber's public message key.

To decrease a subscriber's level of precision, the publisher can cease using the associated public and private location keys to ensure the subscriber can no longer decrypt the more precise location information. A new location key pair can be generated by the publishing device, and the private keys redistributed to the remaining subscriber in the group who are not being downgraded. The subscriber that is downgraded can get another private location key corresponding to the new, decreased level of precision from the publisher.

A publisher may want to temporarily share more precise location information with a specific subscriber or group of subscribers. Distributing the private key for the more precise location information for an already-published, lower level of location precision can give those subscribers permanent access to the higher precision location information, which may not be the intended result. Therefore, a new location key pair can be generated by the publishing device, and the private key distributed to the subscribers for the temporary sharing. A user interface on the publishing device can make clear which subscriber(s) can receive the location information, and provide a time limit to automatically cease publishing of the location information at that level or precision. The time limit can be a manually specified duration or end time, or tied to another trigger event on the publishing device, such as the ending of a phone call, the end of an event in the publisher's calendar, etc.

To temporarily suspend publishing of location information at a given level of precision, the publishing device can stop sending the location information to the distribution service. In this scenario, no encryption key management needs to take place. As with temporary upgrades, the publisher can manually set the duration or end time of the suspension, or tie the suspension to another trigger event, such as an event in the publisher's calendar.

Exemplary Process Flow (Publishing Device)

Figure 2A:
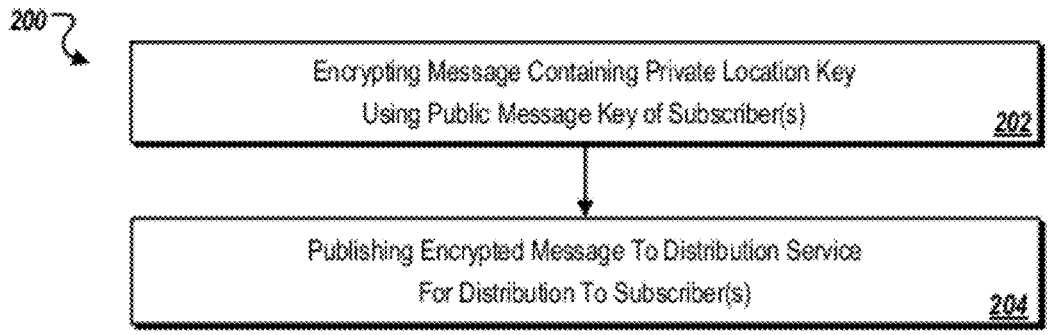
FIGS. 2A and 2B are flow diagrams of a variable precision location sharing process performed by a publishing device.
Figure 2B:
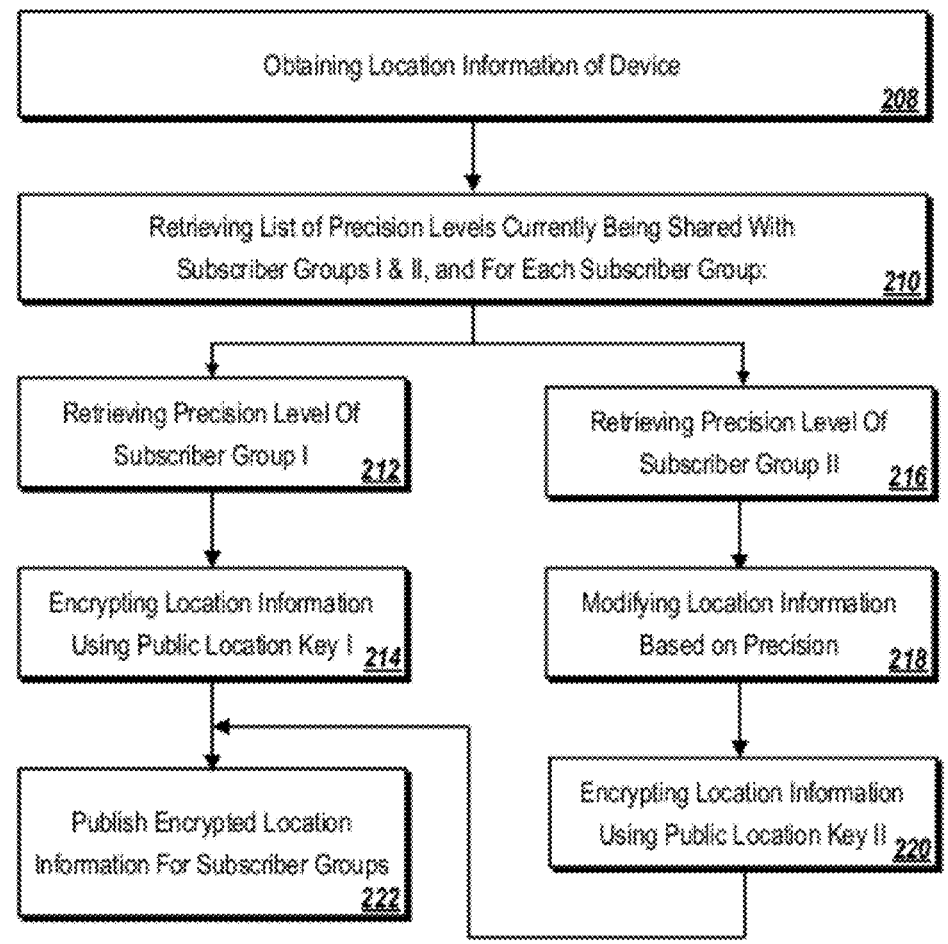

FIGS. 2A and 2B are flow diagrams of a variable precision location sharing processes 200, 206 performed by a publishing device. Processes 200, 206 can be performed by the device architecture described in reference to FIG. 4. Process 206 is an example of a publishing device process that is performed for two subscriber groups having two different levels of location precision. Process 206, however, can be used for more than two subscriber Groups having any desired number of subscribers and for more than two levels of precision.

Referring to FIG. 2A, in some implementations, process 200 can begin by encrypting a message containing a private location key using a public message key of one or more subscribing devices (202). The encrypted message can then be published to a distribution service for distribution to the one or more subscribing devices (204). The private location key corresponds to a location of the publishing device having a specified spatial and/or temporal precision, as described in reference to FIG. 1C.

Referring to FIG. 2B, on a scheduled basis or in response to a trigger event, process 206 can begin by obtaining location information describing the location of the publishing device (208). The location information can be obtained from various positioning technologies, including but not limited to GPS, WiFi and Cell-ID positioning technologies.

A list of precision levels currently being shared with Subscriber Groups I and II is retrieved (210). In this example, a precise precision level is retrieved for Subscriber Group I (212) and an imprecise precision level is retrieved for Subscriber Group II (216). Spatial and/or temporal precision levels can be specified for the Subscriber Groups through a user interface (e.g., the user interface shown FIG. 1B) or programmatically by an application (e.g., through an API).

For Subscriber Group I, unmodified location information is encrypted using a public location key I (214). On a specified schedule or in response to a trigger event, the encrypted location information is published to the distribution service for distribution to Subscriber Group I (222).

For Subscriber Group II, the location information is modified based on the specified precision level for Subscriber Group II (218). For example, if the publisher specifies a spatial precision of 10 miles, then the location information provided by the positioning technology can be randomized to fall within a geographic region encompassed by circle with a radius of 10 miles. Temporal precision can also be specified by the publisher. For example, the publisher can specify that location updates will be published to subscribing devices every 2 hours. The modified location information is encrypted using a public location key II (220) corresponding to the private location key, as described in reference to FIG. 2A. On a specified schedule or in response to a trigger event, the encrypted modified location information for Subscriber Group II is published to the distribution service for distribution to Subscriber Group II (222).

The publishing device can generate a location key pair from a random number generator using known key generation techniques (e.g., RSA key generation). The public location key can be included in messages sent separately to each subscribing device via the distribution service. The message can be individually encrypted using a unique public message key of each subscribing device. In some implementations, public message keys can be distributed by a TTP service through a communication channel that is different than the communication channel used to send and receive the messages containing the private location keys.

Exemplary Process Flow (Subscribing Device)

Figure 3A:
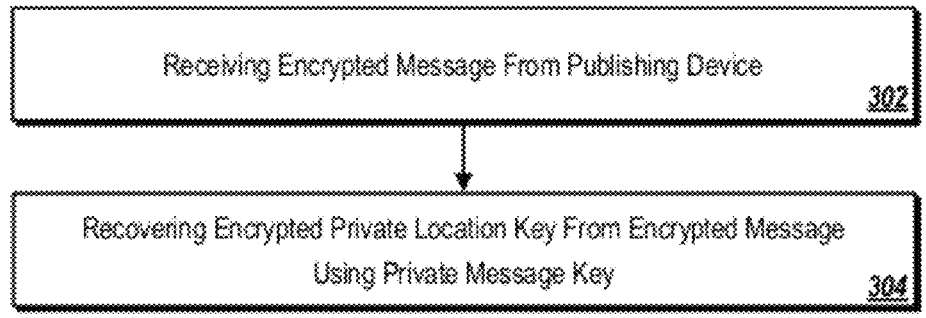
FIGS. 3A and 3B are flow diagrams of a variable precision location sharing process performed by a subscribing device.
Figure 3B:
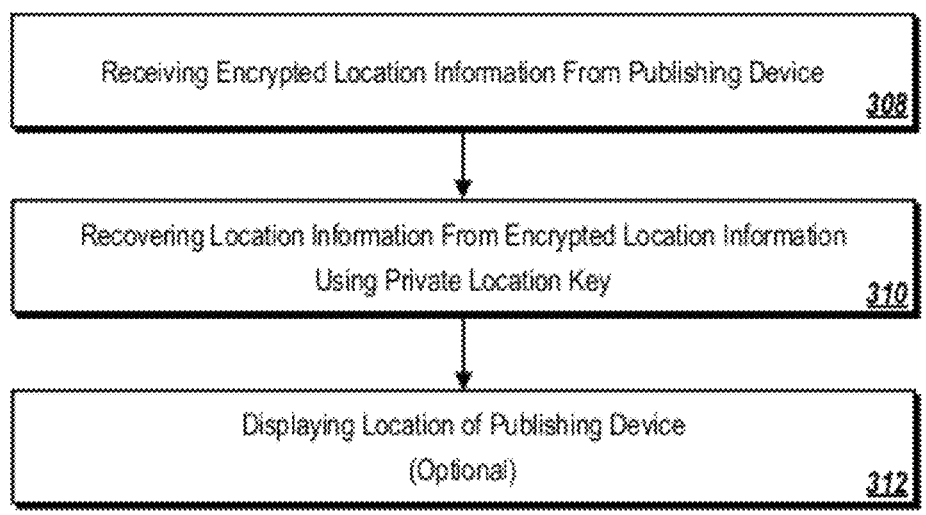

FIGS. 3A and 3B are flow diagrams of a variable precision location sharing processes 300, 306 performed by a subscribing device. Processes 300, 306 can be performed by the device architecture described in reference to FIG. 4.

Referring to FIG. 3A, in some implementations, process 300 can begin by receiving an encrypted message from a publishing device (302). The message can be encrypted using a public message key associated with the subscribing device. A private location key can be decrypted from the encrypted message using a corresponding private message key (304). In some implementations, the public message key can be received from a TTP service over a communications channel that is different than the communication channel for receiving the message.

Referring to FIG. 3B, on a scheduled basis or in response to a trigger event, encrypted location information is received from the publishing device (308). The location information is decrypted from the encrypted location information using the previously received private location key (310), as described in reference to FIG. 3A. Optionally, the location of the publishing device can be displayed (312). For example, the subscribing device can display a map with a marker (e.g., a pushpin) showing the location of the publishing device. If the location is imprecise based on a specified spatial precision, then a circle can be overlaid on the map with the pushpin at the center of the circle. The radius of the circle can correspond to the specified spatial precision.

Exemplary Device Architecture

Figure 4:
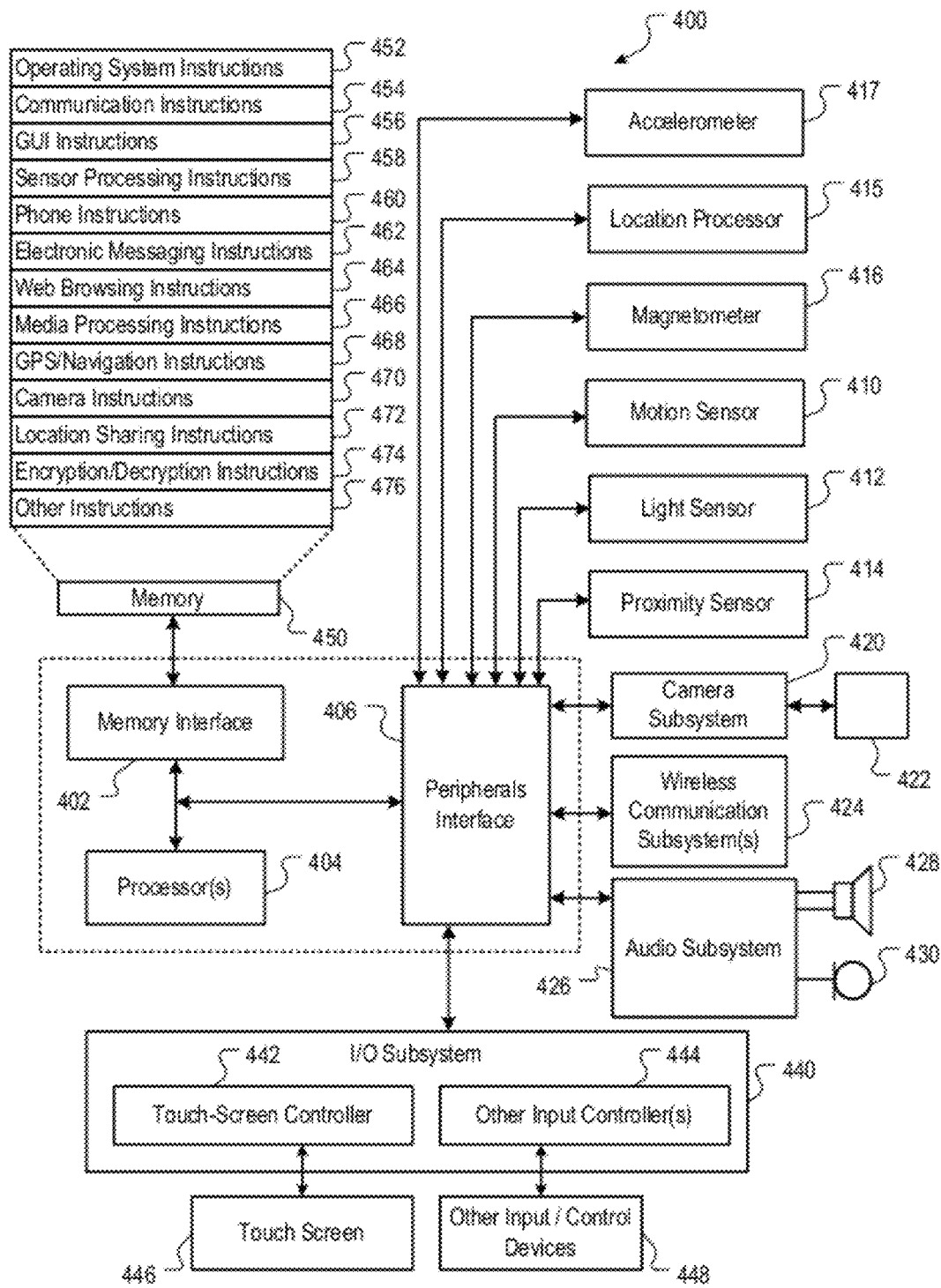
FIG. 4 is a block diagram of exemplary hardware architecture for a publishing or subscribing device implementing the features and processes described in reference to FIGS. 1-3.

FIG. 4 is a block diagram of exemplary hardware architecture for a publishing or subscribing device implementing the features and processes described in reference to FIGS. 1-3. The device can include memory interface 402, one or more data processors, image processors and/or processors 404, and peripherals interface 406. Memory interface 402, one or more processors 404 and/or peripherals interface 406 can be separate components or can be integrated in one or more integrated circuits. The various components in the device, for example, can be coupled by one or more communication buses or signal lines.

Sensors, devices, and subsystems can be coupled to peripherals interface 406 to facilitate multiple functionalities. For example, motion sensor 410, light sensor 412, and proximity sensor 414 can be coupled to peripherals interface 406 to facilitate orientation, lighting, and proximity functions of the mobile device. Location processor 415 (e.g., GPS receiver) can be connected to peripherals interface 406 to provide geopositioning. Electronic magnetometer 416 (e.g., an integrated circuit chip) can also be connected to peripherals interface 406 to provide data that can be used to determine the direction of magnetic North. Thus, electronic magnetometer 416 can be used as an electronic compass. Accelerometer 417 can also be connected to peripherals interface 406 to provide data that can be used to determine change of speed and direction of movement of the mobile device.

Camera subsystem 420 and an optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which a mobile device is intended to operate. For example, a mobile device can include communication subsystems 424 designed to operate over a GSM network, a GPRS network, an EDGE network, a WiFi or WiMax network, and a Bluetooth network. In particular, the wireless communication subsystems 424 can include hosting protocols such that the mobile device can be configured as a base station for other wireless devices.

Audio subsystem 426 can be coupled to a speaker 428 and a microphone 430 to facilitate voice-enabled functions, such as voice recognition, voice replication, digital recording, and telephony functions.

I/O subsystem 440 can include touch screen controller 442 and/or other input controller(s) 444. Touch-screen controller 442 can be coupled to a touch screen 446 or pad. Touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 446.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of speaker 428 and/or microphone 430.

In one implementation, a pressing of the button for a first duration may disengage a lock of the touch screen 446; and a pressing of the button for a second duration that is longer than the first duration may turn power to the device on or off. The user may be able to customize a functionality of one or more of the buttons. The touch screen 446 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can be used.

Memory interface 402 can be coupled to memory 450. Memory 450 can include high-speed random access memory and/or non-volatile memory, such as one or more magnetic disk storage devices, one or more optical storage devices, and/or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers and/or one or more servers. Memory 450 may include graphical user interface instructions 456 to facilitate graphic user interface processing, such as the user interfaces illustrated in FIGS. 1-4; sensor processing instructions 458 to facilitate sensor-related processing and functions; phone instructions 460 to facilitate phone-related processes and functions; electronic messaging instructions 462 to facilitate electronic-messaging related processes and functions, such as SMS and MMS; web browsing instructions 464 to facilitate web browsing-related processes and functions; media processing instructions 466 to facilitate media processing-related processes and functions; GPS/Navigation instructions 468 to facilitate GPS and navigation-related processes and instructions; and camera instructions 470 to facilitate camera-related processes and functions. The memory 450 may also store other software instructions (not shown), such as security instructions, web video instructions to facilitate web video-related processes and functions, and/or web shopping instructions to facilitate web shopping-related processes and functions.

Memory 450 can include instructions for variable precision location sharing 472 and encryption/decryption instructions 474, as well as other instructions 476 for implementing the feature, user interfaces, and processes described in reference to FIGS. 1-3.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. Yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer implemented method performed by one or more hardware processors of a mobile device, the method comprising:
    obtaining location information describing the location of the mobile device;
    receiving a specification of (i) a precision of the location information and (ii) a trigger event on the mobile device, the precision being specified in the form of a precision value among a range of precision values, and the trigger event being specified as an occurrence of either a phone call carried out by the mobile device or an entry on a calendar associated with the mobile device;
    modifying the location information based on the specified precision;
    choosing an encryption key among a plurality of encryption keys each associated with a respective precision, wherein the chosen encryption key is associated with the specified precision;
    encrypting the modified location information using the chosen encryption key;
    detecting the trigger event by determining the occurrence of either the phone call or the calendar entry; and
    in response to the detecting of the trigger event, publishing, during the occurrence of either the phone call or the calendar entry, the encrypted location information to a distribution service for distribution to one or more subscribers.

2. The method of claim 1, wherein the chosen encryption key associated with the specified precision of the location information is a public location key.

3. The method of claim 1, wherein the specification of the precision of the location information comprises a precision level associated with at least one group of subscribers among the one or more subscribers.

4. The method of claim 1, wherein receiving the specification of a precision of the location information comprises receiving a list of precision levels and choosing a precision level in the received list of precision levels.

5. The method of claim 4, wherein the precision level in the received list of precision levels is chosen based on an identity of a subscriber among the one or more subscribers.

6. The method of claim 5, wherein the identity of the subscriber comprises a group of subscribers to which the subscriber belongs.

7. The method of claim 1, wherein the precision of the location information is received from a user interface of the device, the user interface enabling a user of the device to adjust precision of the location information that is to be distributed to at least one group of subscribers among the one or more subscribers.

8. The method of claim 7, wherein the user interface comprises controls enabling the user to adjust at least one of temporal precision of the location information and spatial precision of the location information.

9. A system comprising:
    a processor;
    memory coupled to the processor and storing instructions, which, when executed by the processor, causes the processor to perform operations comprising:
        obtaining location information describing the location of a mobile device;
        receiving a specification of (i) a precision of the location information and (ii) a trigger event on the mobile device, the precision being specified in the form of a precision value among a range of precision values, and the trigger event being specified as an occurrence of either a phone call carried out by the mobile device or an entry on a calendar associated with the mobile device;
        modifying the location information based on the specified precision;
        choosing an encryption key among a plurality of encryption keys each associated with a respective precision, wherein the chosen encryption key is associated with the specified precision;
        encrypting the modified location information using the chosen encryption key;
        detecting the trigger event by determining the occurrence of either the phone call or the calendar entry; and
        in response to the detecting of the trigger event, publishing, during the occurrence of either the phone call or the calendar entry, the encrypted location information to a distribution service for distribution to one or more subscribers.

10. The system of claim 9, wherein the chosen encryption key associated with the specified precision of the location information is a public location key.

11. The system of claim 9, wherein the specification of the precision of the location information comprises a precision level associated with at least one group of subscribers among the one or more subscribers.

12. The system of claim 9, wherein receiving the specification of a precision of the location information comprises receiving a list of precision levels and choosing a precision level in the received list of precision levels.

13. The system of claim 12, wherein the precision level in the received list of precision levels is chosen based on an identity of a subscriber among the one or more subscribers.

14. The system of claim 13, wherein the identity of the subscriber comprises a group of subscribers to which the subscriber belongs.

15. The system of claim 9, wherein the precision of the location information is received from a user interface of the device, the user interface enabling a user of the device to adjust precision of the location information that is to be distributed to at least one group of subscribers among the one or more subscribers.

16. The system of claim 15, wherein the user interface comprises controls enabling the user to adjust at least one of temporal precision of the location information and spatial precision of the location information.

* * * * *